May 25, 1954 — W. E. REYNOLDS — 2,679,109
GEAR CUTTER SETTING GAUGE
Filed June 8, 1951

INVENTOR.
WILLIAM E. REYNOLDS.
BY Dybvig & Dybvig
His Attorneys

Patented May 25, 1954

2,679,109

UNITED STATES PATENT OFFICE 2,679,109

GEAR CUTTER SETTING GAUGE

William E. Reynolds, Dayton, Ohio

Application June 8, 1951, Serial No. 230,549

7 Claims. (Cl. 33—185)

This invention relates to a gear cutting gauge and more particularly to a gauge of the type to be used when cutting gears on a machine that has no cutter setting indicator or when a very accurate gear is required.

The present practice in the industry for setting a gear cutter central on a machine that has no cutter setting indicator is to center the cutter by eye and then take a single cut through a test gear blank. Without changing the position of the cutter, the test blank is then removed from the work arbor and turned end for end. The test blank is left loose on the arbor and then with the cutter stopped it is fed into the slot already cut. The cutter is then run just long enough to mark its position in relation to the slot produced by the first cut. If the cutter is exactly central, the second cut will follow the outline of the first cut, but if it is out of center, the cutter will cut some stock from the top of the space on the one side and from the bottom on the other side, indicating that the cutter table should be moved laterally away from the side of the tooth from which stock was removed from the bottom. After moving the table by guess, the above operation is repeated until the cutter is properly centered, after which the test gear blank is removed and replaced by the blank on which the teeth are to be cut. The above procedure is not only time consuming but also requires extra good lighting and good eyesight and judgment on the part of the operator.

It is an object of this invention to provide a gauge which will eliminate the need for the above time consuming procedure.

More particularly, it is an object of this invention to provide a gauge which will directly indicate to the operator when the gear cutter is centrally set with respect to the means for supporting the gear blank.

Another object of this invention is to provide a gear setting gauge which is easy to operate and which will give a direct reading indicative of the extent of misalignment, if any, between the gear cutter and the gear blank.

Still another object of this invention is to provide a gauge which may be mounted directly on the gear cutter and which includes means for engaging one of the centers between which the gear blank is adapted to be supported.

More particularly, it is an object of this invention to provide a simple device which is easily and quickly mounted on the gear cutter and which includes a gauge for indicating any misalignment between the gear cutter and one of the centers between which the gear blank is adapted to be supported.

Other objects and advantages reside in the construction of parts, the combination thereof and the mode of operation, as will become more apparent from the following description.

Figure 1:
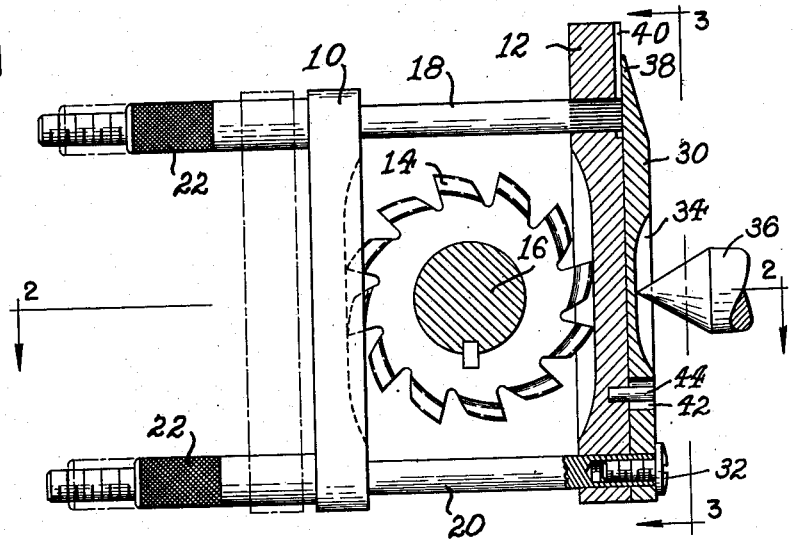
Figure 1 is an elevational view, with parts broken away, showing the gauge mounted on a gear cutter and showing the indicator part of the gauge arranged in contact with one of the centers on the gear blank supporting arbor.

Referring now to the drawing wherein I have shown a preferred embodiment of my invention, reference numerals 10 and 12 designate the jaws of a clamp which is adapted to engage a gear cutter 14 mounted on an arbor 16 of a milling machine or the like. The jaw element 10 is slidably supported on rods 18 and 20 which are rigidly secured at their one end to the jaw element 12. The free ends of the rods 18 and 20 are threaded as shown, so as to receive the knurled sleeve nuts 22 as shown. The distance between the jaws 10 and 12 may be changed by adjusting the position of the nuts 22. Thus, by partly unscrewing the nuts 22, the jaw 10 may be moved out of engagement with the gear cutting element 14, so as to remove the gauge from the gear cutter.

Figure 2:
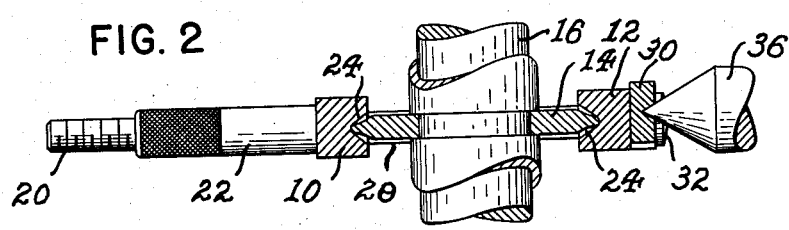
Figure 2 is a sectional view taken substantially on line 2—2 of Figure 1.

As best shown in Figure 2 of the drawing, each of the jaws 10 and 12 is provided with a V-shaped slot 24 which is adapted to receive teeth on the gear cutter 14, so as to accurately align the gauge with the gear cutter 14. It will be noted that the slots 24 are deep enough and long enough so as to engage two adjacent teeth on the gear cutter 14. By virtue of the fact that the jaws snugly engage two teeth on each side of the gear cutter, the gauge is held in accurate alignment with the gear cutter when the jaws are firmly clamped against the gear cutter, as shown in Figures 1 and 2 of the drawing.

It will be noted that the jaws 10 and 12 cooperate with the rods 18 and 20 so as to form in substance a frame which is held in fixed relationship relative to the gear cutter and which may be used for supporting an indicator.

After the gear cutter 14 has been mounted on the work arbor of a milling machine or the like, it is necessary to accurately align it with respect to the centers used in supporting the gear blank which is to be used in making the gear. In view of the fact that once the gear cutter is properly lined up with either one of the centers used in supporting the gear blank, it will obviously be properly lined up with the other center. It is only necessary to check the alignment between the gear cutter and one center, which may be either the tailstock center or the dividing head center.

In view of the fact that the construction of the milling machine, the dividing head, and the rest of the mechanism for supporting the gear blanks is notoriously old, it has not been considered necessary to disclose these elements in detail. For purpose of illustration, only the one center 36 has been shown and this may represent either the tailstock center or the dividing head center of a conventional milling machine.

In the gauge shown, an indicator element 30 is pivotally supported on the outer end of the rod 20 and is held in place by the cap screw 32 against the one side of the jaw element 12, as shown. This indicator element is provided with a V-shaped slot in its one face for engaging the center 36.

Figure 3:
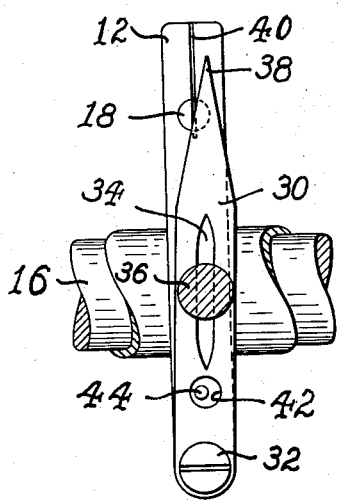
Figure 3 is an elevational view taken substantially on line 3—3 of Figure 1 showing the position of the indicator when the gear cutter is off center with respect to the centers used in supporting the gear blank.
Figure 4:
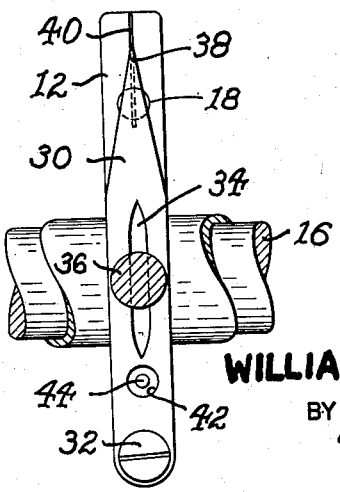
Figure 4 is a view similar to Figure 3 showing the position of the indicator when the gear cutter is set central.

Any misalignment between the gear cutter 14 and the center 36 will cause the indicator 30 to be moved off center, as indicated in Figure 3 of the drawing. In order to properly center the gear cutter 14 with respect to the center 36, the centers are shifted relative to the gear cutter 14 until the pointer 38 of the indicator 30 lines up with the groove or other type of mark 40 provided on the one face of the jaw element 12.

The indicator 30 is provided with a hole or slot 42 which cooperates with a pin 44 carried by the jaw 12 so as to limit the pivotal movement of the indicator 30 relative to the supporting jaw element 12. In view of the mechanical advantage which results from the arrangement of the pivoted indicator 30, it is obvious that any misalignment between the gear cutter and the center will be shown up by the pointer 38 in an exaggerated manner, so that the operator can very accurately center the gear cutter when using a gauge of the type disclosed herein. It will also be noted that the gauge is very simple in construction and operation and the nature of it is such that it may be made very sturdy so as to withstand the abuse which devices of this type must withstand.

For purpose of illustrating the invention, I have shown the gauge used in connection with a device for use in cutting gear teeth, whereas the gauge can also be used in centering a saw blade or the like directly over a shaft or other device in which a spline, key seat, or the like is to be cut.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A gauge for use in centering a gear cutter relative to the gear blank supporting centers of a milling machine or the like comprising a pair of jaws having substantially V-shaped slots formed in their opposing faces edges, means for supporting said jaws in gripping relationship with the teeth of a gear cutter, an indicator pivotally supported on one of said jaws, and overlying said jaw, said indicator having socket means for engaging one of the gear blank supporting centers, and means on said jaw for indicating the degree of misalignment, if any, between said jaw and said center.

2. A gauge for use in centering a gear cutter relative to the gear blank supporting centers of a milling machine or the like, comprising in combination, a pair of clamp elements, means for supporting said clamp elements for movement toward and from one another, the opposing faces of said clamp elements being provided with substantially V-shaped notches for engaging the teeth of a gear cutter, and an indicator pivotally mounted adjacent one of said clamp elements and engaging one of said centers, said indicator indicating the relative position of said one clamp element with respect to said one center.

3. A gauge for use in centering a gear cutter relative to the gear blank supporting centers of a milling machine or the like, comprising in combination, a pair of clamp elements, means for supporting said clamp elements for movement toward and from one another, the opposing faces of said clamp elements being provided with substantially V-shaped notches for engaging the teeth of a gear cutter, and an indicator pivotally mounted adjacent one of said clamp elements for engaging one of said centers, said means for supporting said clamp elements comprising a pair of parallel bars secured to one of said clamp elements and arranged to slidably support the other of said clamp elements.

4. A gauge for use in centering a gear cutter relative to the gear blank supporting centers of a milling machine or the like, comprising in combination, a pair of clamp elements, means for supporting said clamp elements for movement toward and from one another, the opposing faces of said clamp elements being provided with substantially V-shaped notches for engaging the teeth of a gear cutter, and an indicator pivotally mounted adjacent one of said clamp elements for engaging one of said centers, said means for supporting said clamp elements comprising a pair of parallel bars secured to one of said clamp elements and arranged to slidably support the other of said clamp elements, said indicator comprising a pointer pivotally mounted on one of said bars.

5. A gauge for use in centering a gear cutter relative to the gear blank supporting centers of a milling machine or the like, comprising in combination, a pair of clamp elements, means for supporting said clamp elements for movement toward and from one another, the opposing faces of said clamp elements being provided with substantially V-shaped notches for engaging the teeth of a gear cutter, an indicator pivotally mounted adjacent one of said clamp elements for engaging one of said centers, said means for supporting said clamp elements comprising a pair of parallel bars secured to one of said clamp elements and arranged to slidably support the other of said clamp elements, and means carried by said bars for holding said clamp elements firmly in engagement with the teeth on the gear cutter.

6. A gauge for use in centering a gear cutter relative to the gear blank supporting centers of a milling machine or the like, comprising in combination, a pair of clamp elements, means for supporting said clamp elements for movement toward and from one another, the opposing faces of said clamp elements being provided with substantially V-shaped notches for engaging the teeth of a gear cutter, an indicator pivotally mounted adjacent one of said clamp elements for engaging one of said centers, said means for supporting said clamp elements comprising a pair of parallel bars secured to one of said clamp elements and arranged to slidably support said bars for holding said clamp elements firmly in engagement with the teeth on the gear cutter, said last named means comprising knurled sleeve nuts threaded on said bars.

7. A gauge for use in a milling machine or the like having a gear cutter support arranged to rotate upon an axis perpendicular to the axis of a gear blank support, comprising in combination, a frame, means for clamping said frame in fixed relationship relative to said gear cutter, a member adjustably mounted upon said frame and engaging said gear blank support and being movable thereby, said member indicating the degree of misalignment, if any, between said cutter support and said gear blank support, said frame having substantially V-shaped grooves provided in two sides thereof for engaging the teeth on opposite sides of said gear cutter so as to provide accurate alignment between said frame and the gear cutter.

References Cited in the file of this patent

UNITED STATES PATENTS

| Number | Name | Date |
|---|---|---|
| 1,422,746 | Couse | July 11, 1922 |
| 2,379,406 | Alvis | July 3, 1945 |
| 2,398,066 | Whale | Apr. 9, 1946 |
| 2,621,420 | Brelsford | Dec. 16, 1952 |